(12) United States Patent
Mano (10) Patent No.: US 8,007,119 B2
(45) Date of Patent: Aug. 30, 2011

(54) LAMP SYSTEM AND LAMP DEFLECTION CONTROL METHOD

(75) Inventor: Mitsuharu Mano, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 352 days.

(21) Appl. No.: 12/195,959

(22) Filed: Aug. 21, 2008

(65) Prior Publication Data

US 2009/0052156 A1    Feb. 26, 2009

(30) Foreign Application Priority Data

Aug. 22, 2007  (JP) ................................ 2007-215459

(51) Int. Cl.
*B60Q 1/12* (2006.01)
(52) U.S. Cl. .......................................... 362/37; 362/464
(58) Field of Classification Search ............... 362/37, 362/464–466

See application file for complete search history.

(56) References Cited

U.S. PATENT DOCUMENTS

| | | | | |
|---|---|---|---|---|
| 5,099,400 A * | 3/1992 | Lee | ................................ | 362/37 |
| 6,671,640 B2 * | 12/2003 | Okuchi et al. | ................... | 702/95 |
| 7,118,238 B2 * | 10/2006 | Ishiguro | ........................... | 362/37 |
| 7,239,951 B2 * | 7/2007 | Sugimoto et al. | ............... | 701/49 |
| 7,246,021 B2 * | 7/2007 | Morishita | ........................ | 702/95 |

FOREIGN PATENT DOCUMENTS

JP    2002-178829 A    6/2002

\* cited by examiner

*Primary Examiner* — Alan Cariaso
*Assistant Examiner* — Stanley Weinberg
(74) *Attorney, Agent, or Firm* — Sughrue Mion, PLLC (57) ABSTRACT

A lamp system and method are provided. The system includes a swivel control section which is configured to control an irradiating direction of a lamp so as to follow a steering angle of a steering wheel of a vehicle, a filter section which is configured to change a following response of a change of the irradiating direction with respect to a change of the steering angle, and a filter control section which is configured to control the filter section to decrease the following response when an angular acceleration of the steering angle is greater than or equal to a reference value.

8 Claims, 6 Drawing Sheets

LAMP SYSTEM AND LAMP DEFLECTION CONTROL METHOD

FIELD OF THE INVENTION

Systems and methods consistent with the present invention relate to lamps and, more particularly, to headlamps of vehicles and to control of lamp deflection according to changes in a steering angle of the vehicle.

DESCRIPTION OF THE RELATED ART

There has been proposed an adaptive front lighting system (AFS) in which a deflection of an irradiating direction of a vehicle headlamp is controlled in right and left directions to follow a steering angle of a steering wheel, thereby enhancing safety in driving the vehicle. According to this system, not only can the irradiating direction of the headlamp be directed to a straight-ahead direction but also the irradiating direction of the headlamp can be directed to a direction in which a driver steers the vehicle, that is, a direction in which the vehicle is being driven, and hence, this system is effective in the enhancement of safety in driving the vehicles. In this lamp system, however, there may occur a situation in which the lamp system controls the deflection of the irradiating direction of the headlamp even when the driver conducts a sawing operation of turning a steering within in a minute angular range to make a minute adjustment to the traveling direction of the vehicle, or when the direction of steered road wheels are changed minutely as the vehicle travels on a bumpy road surface. In the event that the irradiating direction of the headlamp is subjected to the deflection control in these situation in which the driver has no intention to change the traveling direction of the vehicle, the driver is made to feel the sensation of physical disorder and moreover, there may be caused a case where a sufficient forward illumination in the traveling direction cannot be given to the vehicle, causing unsafe driving conditions.

To address a problem like this, there has been proposed a related art lamp system in which an ignorable range is set in a steering angle of a steering wheel so that no deflection control is carried out on a headlamp within the ignorable range to thereby prevent an untended deflection control from being carried out on the headlamp when the steering angle is changed within a minute range (see, e.g., JP 2002-178829 A). In addition, a displacement speed of the steering angle, i.e., an angular speed is detected, so that the response of a deflection control angle to a steering angle is controlled to be changed in accordance with the angular speed so detected. More specifically, there are provided a filtering means (whose filtering effect is low) for setting a following response of the irradiating direction of the headlamp to the angular speed of the steering angle when the steering angle is high and another filtering means (whose filtering effect is high) for setting the following response of the irradiating direction of the headlamp to the angular speed of the steering angle when the steering angle is low. Thus, when the angular speed of the steering angle is low, the filtering means for setting the response that is low is selected so that the irradiating direction is changed slowly to follow the steering angle for such slow steering, whereas when the angular speed of the steering angle is high, the filtering means for setting the response that is high is selected so that the irradiating direction is made to follow the steering angle with ease for such quick steering.

In the related art described above, the filtering means are selected in accordance with the angular speed of the steering angle, and for the slow steering, in particular, the irradiating direction of the headlamp is prevented from becoming oversensitive in following the change in steering angle, whereby the driver is prevented from being made to feel the sensation of physical disorder. However, if the irradiating direction of the headlamp follows the steering angle too sensitively when the steering wheel is turned quickly, the irradiating direction becomes oversensitively changed if the steering wheel is turned minutely by the sawing operation by the driver or due to irregularities on the road surface, whereby the irradiating direction is deflected irrespective of the fact that the driver has no intention of steering the vehicle, thereby making the driver feel the sensation of physical disorder. Thus, in the related art, a minute range of the steering angle is set as the ignorable range, so that the irradiating direction of the headlamp is not deflected in the ignorable range. This is because if the irradiating direction is deflected frequently by minute changes in the steering angle while the vehicle is traveling straight ahead, the driver is made to feel the sensation of troublesomeness, which is not good in ensuring safety driving. However, if the ignorable range is too small, such an object cannot be attained. On the contrary, if the ignorable range is too large, for example, in the event that the driver attempts to change lanes while driving the vehicle at high speeds, the system is not activated as long as the steering angle falls within the large ignorable range, resulting in a case where the headlamp cannot illuminate the lane to be changed.

In addition, in the related art described above, when the steering wheel is turned slowly in a case such as driving on a curved path in urban areas, the irradiating direction of the headlamp may not follow the steering angle, whereby the illumination of the curved path becomes insufficient. In particular, when turning right or left at an intersection in urban roads, since in many cases the steering wheel is turned slowly, it becomes difficult to direct the irradiating direction of the headlamp to the traveling direction timely, and in this respect, the driver is made to feel the sensation of physical disorder, and the illumination of in the traveling direction of the vehicle becomes insufficient, this eventually causes a problem with ensuring safety driving.

SUMMARY OF THE INVENTION

Exemplary embodiments of the present invention address the above disadvantages and other disadvantages not described above. Aspects of the present invention relate to the above problem. However, the present invention is not required to overcome the disadvantages described above, and thus, an exemplary embodiment of the present invention may not overcome any of the problems described above.

It is an aspect of the present invention to provide a lamp system and a deflection control method therefor which can realize, when controlling a deflection of an irradiating direction of a headlamp, a lighting that does not make a driver feel the sensation of physical disorder while ensuring the safety driving of the vehicle.

According an illustrative aspect of the present invention, a lamp system is provided. The system includes a swivel control section which is configured to control an irradiating direction of a lamp so as to follow a steering angle of a steering wheel of a vehicle, a filter section which is configured to change a following response of a change of the irradiating direction with respect to a change of the steering angle, and a filter control section which is configured to control the filter section to decrease the following response when an angular acceleration of the steering angle is greater than or equal to a reference value.

According another illustrative aspect of the present invention, a method of controlling a deflection of an irradiating direction of a lamp is provided. The method includes detecting a steering angle of a steering wheel, calculating an angular acceleration of the detected steering angle, comparing the calculated angular acceleration with a reference value, and decreasing a following response of the deflection of the irradiating direction with respect to the steering angle if the calculated angular acceleration is greater than or equal to the reference value.

Other aspects and advantages of the invention will be apparent from the following description, the drawings and the claims.

DETAILED DESCRIPTION OF EXEMPLARY EMBODIMENTS OF THE PRESENT INVENTION

Hereinafter, exemplary embodiments of the invention will be explained with reference to the drawings. The following exemplary embodiments do not limit the scope of the invention.

First Exemplary Embodiment

Figure 1:
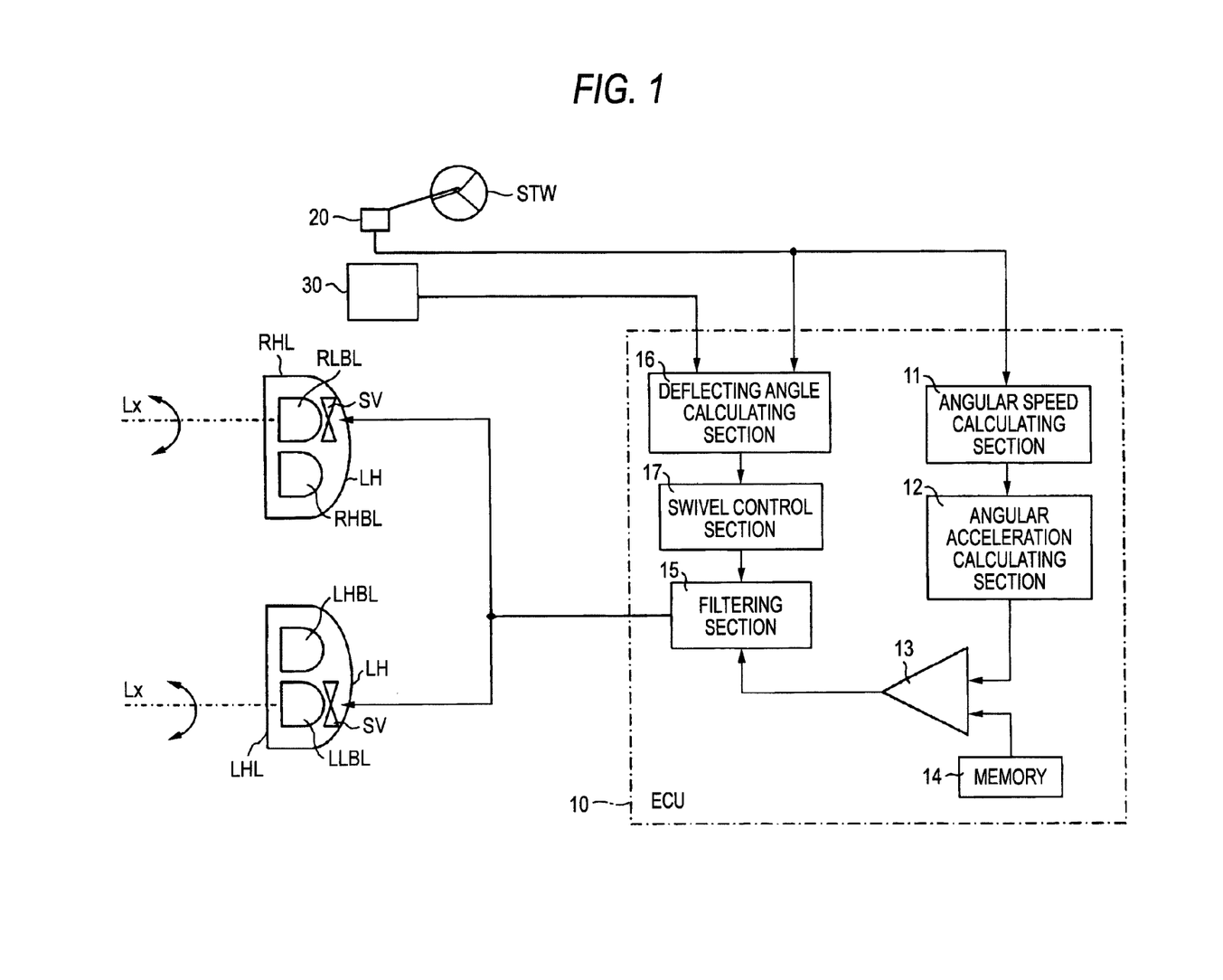
FIG. 1 is a block diagram of a lamp system according to a first exemplary embodiment of the invention.

FIG. 1 is a diagram of a lamp system according to a first exemplary embodiment. This lamp system is applicable to right and left-side headlamps of a vehicle. The vehicle may be an automobile or other vehicle which uses a headlamp. In the first exemplary embodiment, a right-side headlamp RHL and a left-side headlamp LHL have basically the same configuration. Each of the headlamps RHL, LHL includes a lamp housing LH having an opening covered by a transparent cover, right and left low-beam lamps RLBL, LLBL having a projector-type lamp unit for irradiating a low-beam light distribution pattern, and right and left high-beam lamps RHBL, LHBL having a lamp unit for irradiating a high-beam light distribution pattern, and the low-beam lamps RLBL, LLBL and the high-beam lamps RHBL, LHBL are accommodated in the respective lamp housings LH. Each of the low-beam lamps RLBL, LLBL are configured such that a deflection of an irradiating direction Lx thereof can be controlled in horizontal directions, i.e., in right and left directions, with a swivel mechanism SV. Because such a swivel mechanism SV is known, a detailed description thereof will be omitted.

Each of the swivel mechanisms SV of the headlamps RHL, LHL are coupled to an Electronic Control Unit (ECU) 10, and right and left deflections of the headlamps RHL, LHL are controlled by the ECU 10. A steering angle sensor 20 which is configured to detect a steering angle of a steering wheel STW, and a vehicle speed sensor 30 configured to detect a vehicle speed are coupled to the ECU 10, and the ECU 10 controls the swivel mechanisms SV based on a steering angle signal from the steering angle sensor 20 and a vehicle speed signal from the vehicle speed sensor 30 so as to control the respective irradiating directions Lx of the low-beam lamps RLBL, LLBL.

The ECU 10 includes an angular speed calculating section 11 which is configured to calculate an angular speed of the steering wheel STW, i.e., a change of a steering angle with respect to a time, based on the steering angle signal from the steering angle sensor 20 indicating the steering angle of the steering wheel STW, an angular acceleration calculating section 12 which is configured to calculate an angular acceleration of the steering wheel STW, i.e., a change of the angular speed obtained by the angular speed calculating section 11 with respect to time, and a filter control section 13 which is configured to compare the angular acceleration obtained by the angular acceleration calculating section 12 with a reference angular acceleration (a reference value) stored in a memory 14 and to control a filtering section 15, which will be described later, based on the result of the comparison. The ECU 10 further includes a deflecting angle calculating section 16 which is configured to calculate a deflecting angle of the irradiating directions Lx of the low-beam lamps RLBL, LLBL, i.e., an angle of the irradiating direction Lx with respect to a straight-ahead direction of the vehicle, based on the steering angle signal from the steering angle sensor 20 and the vehicle speed signal from the vehicle speed sensor 30, a swivel control section 17 which is configured to output a swivel control signal for controlling the swivel mechanisms SV based on a deflecting angle signal from the deflecting angle calculating section 16, and the filtering section 15 which is configured to control an input/output response of the swivel control signal from the swivel control section 17. After having been controlled with respect to its input/output response by the filtering section 15, the swivel control signal is input into the swivel mechanisms SV of the respective headlamps RHL, LHL, whereby a control is executed in such a manner that the irradiating directions Lx of the low-beam lamps RLBL, LLBL of the respective headlamps RHL, LHL are moved toward a direction of the calculated deflecting angle.

Figure 2A:
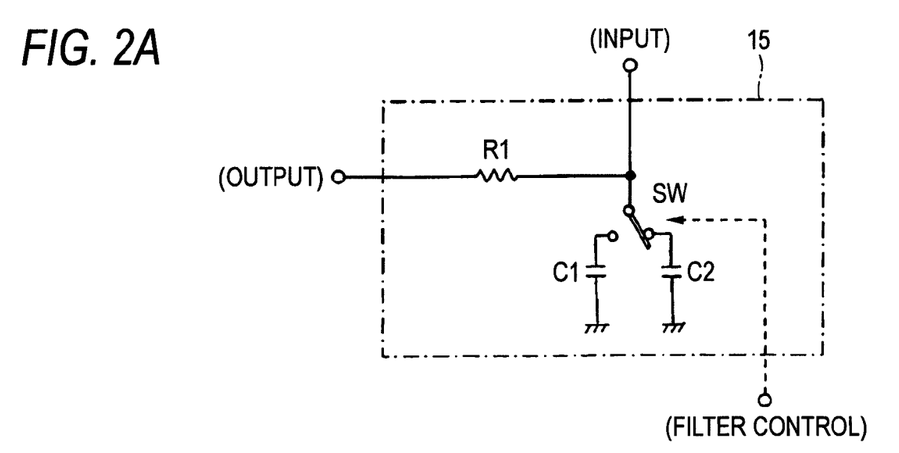
FIGS. 2A to 2C are diagrams illustrating a circuit and functions of a filtering section of the lamp system of FIG. 1.
Figure 2B:
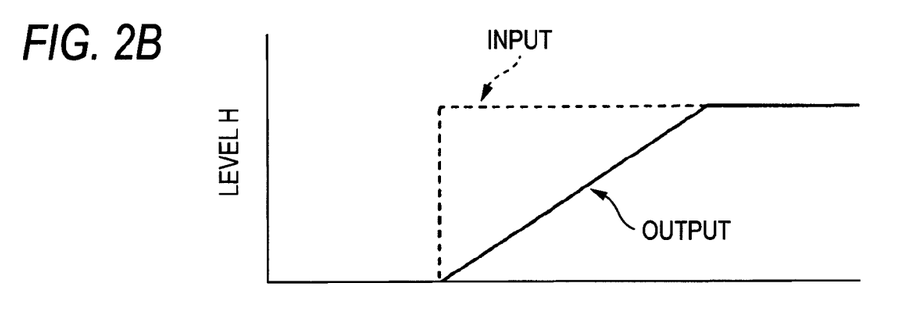
Figure 2C:
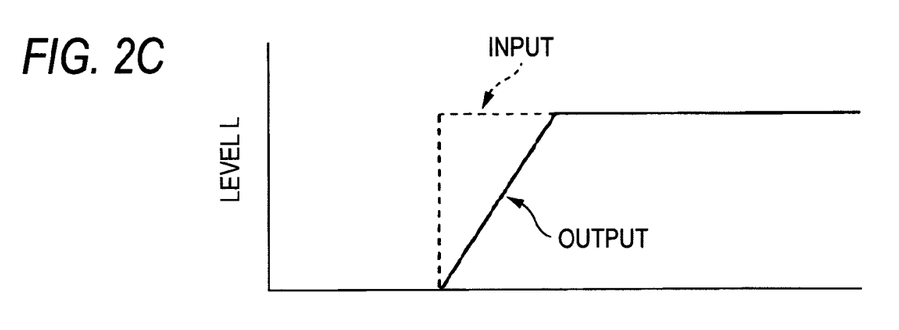

As shown in FIG. 2A, the filtering section 15 includes a CR circuit comprising two capacitors C1, C2 and a resistor R1. The resistor R1 is coupled in series between an input terminal and an output terminal of the filtering section 15, and the capacitors C1, C2 are selectively coupled in parallel to the resistor R1 via a switch SW which is switchable between an H side and an L side. The capacitors C1, C2 have different capacitance values, and in the first exemplary embodiment, the capacitance value of the capacitor C1 is larger than the capacity value of the capacitor C2. The switch SW is configured to be switched based on an output from the filter control section 13 of the ECU 10. More specifically, when the angular acceleration is equal to or larger than the reference value, the switch SW is controlled to select the capacitor C1 on the H side having the larger capacitance value to be coupled to the resistor R1, whereby a time constant of the CR circuit becomes large. Accordingly, the filtering effect becomes high so that the response of the output with respect to the input becomes low as shown in FIG. 2B, i.e., the response of the deflecting angle signal to be input to the swivel mechanisms SV becomes low. On the other hand, when the angular acceleration is smaller than the reference value, the switch SW is controlled to select the capacitor C2 on the L side having the smaller capacity value to be coupled to the resistor R1, whereby the time constant of the CR circuit becomes small. Accordingly, the filtering effect becomes low so that the response of the output with respect to the input becomes high as shown in FIG. 2C, i.e., the response of the deflecting angle signal to be input to the swivel mechanisms SV becomes high. The filtering section 15 is not limited to the circuit having the configuration described above. For example, the circuit may include additional components, may have another circuit configuration, or may be configured with software.

An operation of controlling the response of the irradiating directions of the headlamps in the headlamp system described above will be explained below. Referring to the flowchart of FIG. 3, the angular speed calculating section 11 detects the steering angles of the steering wheel STW from the steering angle signals sent from the steering angle sensor 20 on a constant cycle (S101) and calculates the angular speed based on a difference between a currently-detected steering angle and a previously-detected steering angle (S102). Subsequently, the angular acceleration calculating section 12 detects the angular speeds calculated by the angular speed calculating section 11 on a constant cycle to calculate an angular acceleration based on a difference between a currently-detected angular speed and a previously-detected angular speed (S103). The filter control section 13 compares the calculated angular acceleration with the reference angular acceleration (S104). The reference angular acceleration may be set in advance. If it is determined that the calculated angular acceleration is equal to or larger than the reference angular acceleration (S104: YES), the filter control section 13 outputs a "high filter signal" (S105) to control the filtering section 15. On the other hand, if the calculated angular acceleration is smaller than the reference angular acceleration (S104: NO), the filter control section 13 outputs a "low filter signal" (S106) to control the filtering section 15.

Figure 3:
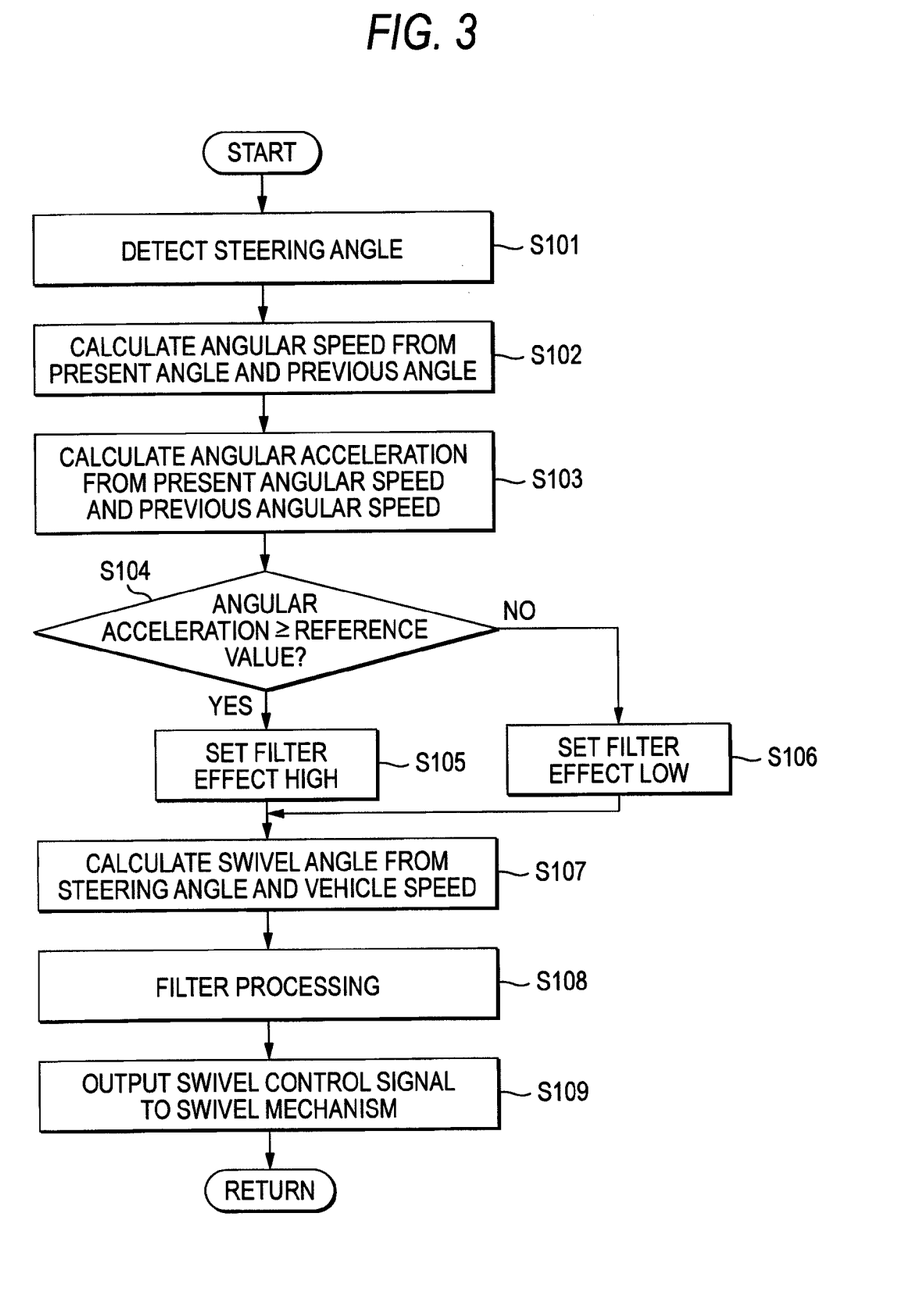
FIG. 3 is a flowchart of an operation of the lamp system of FIG. 1.

More specifically, when the angular acceleration is equal to or larger than the reference angular acceleration, e.g., when starting the steering operation of the steering wheel STW, the filter control section 13 outputs the "high filter signal" to set the switch SW of the filtering section 15 to be on the H side, whereby the capacitor C1 is coupled to the CR circuit to increase the time constant so that the filtering effect of the filtering section 15 acts strongly on the deflection angle signal which has been input to the filtering section 15. On the other hand, when the angular acceleration is smaller than the reference angular acceleration, e.g., when the steering operation of the steering wheel STW is conducted with a constant speed, the filter control section 13 outputs the "low filter signal" to set the switch SW of the filtering section 15 to be on the L side, whereby the capacitor C2 is coupled to the CR circuit to decrease the time constant so that the filtering effect of the filtering section 15 acts weakly on the deflection angle signal which has been input to the filtering section 15.

Further, substantially at the same time as the operations described above, the ECU 10 obtains a steering angle signal from the steering angle sensor 20 and a vehicle speed signal from the vehicle speed sensor 30, so that the deflection angle calculating section 16 calculates an appropriate deflection angle (i.e., a swivel angle) of the irradiating directions Lx of the respective headlamps, i.e. appropriate for the present steering angle of the vehicle, based on the steering angle signal and the vehicle speed signal, and outputs the calculated deflection angle signal to the swivel control section (S107). The swivel control section 17 generates, based on the deflection angle signal input from deflection angle calculating section 16, the swivel control signal for controlling the swivel mechanisms SV so as to deflect the low-beam lamps RLBL, LLBL toward a direction of the calculated deflection angle, and outputs the generated swivel control signal to the filtering section 15. In the filtering section 15, a filter processing is performed (S108) in accordance with the time constant set in operation S105 or S106, that is, the high filtering effect or the low filtering effect. The swivel control signal which has been subjected to the filter processing is output to the swivel mechanisms SV, whereby the irradiating directions Lx of the low-beam lamps RLBL, LLBL are controlled to be deflected rightward or leftward by the operation of the swivel mechanisms SV in such a manner as to follow the steering angle (S109).

Figure 4A:
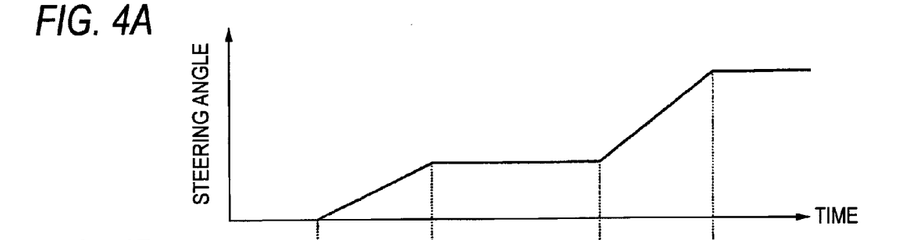
FIGS. 4A to 4E illustrate a timing chart showing a response of a swivel control signal to steering angle.
Figure 4B:
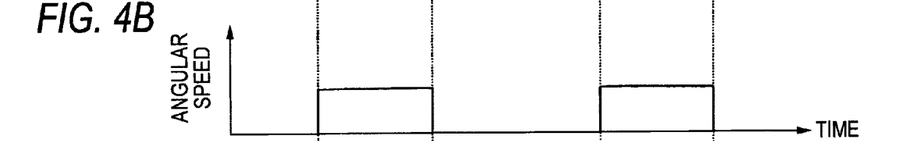
Figure 4C:
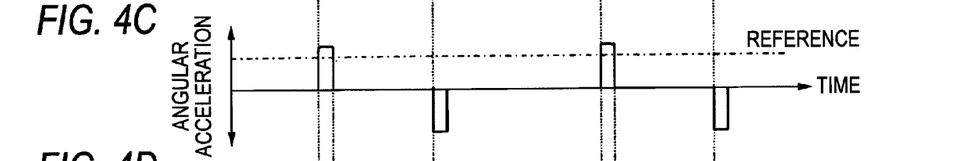
Figures 4D, 4E:
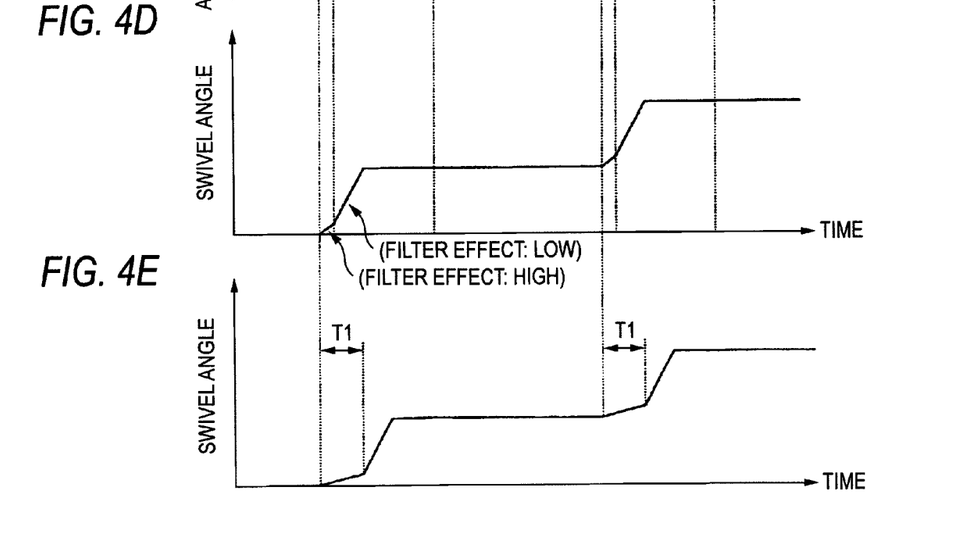

As described above, the deflection angle calculating section 16 calculates the deflection angle based on the steering angle signal and the vehicle speed signal. That is, provided that the steering angle is the same, the deflection angle of the irradiating directions Lx of the low-beam lamps RLBL, LLBL is made to differ in accordance with the vehicle speed. More specifically, when the vehicle speed is high, the deflection angle calculating section 16 calculates the deflection angle to be smaller than in a case where the vehicle speed is lower so that the irradiating directions Lx are prevented from being deflected a large amount from the straight-ahead traveling direction, whereby the driver is prevented from being made to feel the sensation of physical disorder. FIGS. 4A-4D are timing charts. FIG. 4A shows a timing of the steering angle, FIG. 4B shows a timing of the angular speed, FIG. 4C shows a timing of the angular acceleration, and FIG. 4D shows a timing of the deflection angle indicated by the swivel control signal. FIGS. 4A-4D depict a case in which a steering operation is initiated from a straight-ahead traveling state, the steering angle is gradually increased to a certain steering angle, this increased state is held for a certain period of time, the steering operation is resumed thereafter to further increase the steering angle, and the steering angle is held at the increased steering angle. As shown in FIG. 4B, when the steering angle is being increased, the steering wheel is turned with a constant speed. As shown in FIG. 4C, when initiating the steering operation, the angular acceleration increases, and when the angular acceleration is equal to or larger than the reference value, i.e., the reference angular acceleration, the filtering effect of the filtering section 15 is set to be high. Further, after initiating the steering operation, and when the angular acceleration is smaller than the reference value, the filtering effect of the filtering section 15 is set to be low.

Consequently, when the angular acceleration at the time of initiation of the steering operation is equal to or larger than the reference value, the filtering effect of the filtering section 15 becomes high so that the swivel control signal output from the filtering section 15 is suppressed as shown in FIG. 4D, whereby a change in the swivel angle of the irradiating directions Lx which are controlled by the swivel mechanisms SV on the time axis exhibits a characteristic in which an inclination is small. Accordingly, as shown in FIG. 4D, a changing speed of the irradiating directions Lx with respect to a change of the steering angle becomes slower than the normal changing speed, resulting in a characteristic in which the following response is low. On the other hand, when the angular acceleration after the initiation of the steering operation is smaller than the reference value, the filtering effect of the filtering section 15 becomes low so that the swivel control signal is output from the filtering section 15 to the swivel mechanisms SV without being suppressed, whereby the change in swivel angle of the irradiating directions Lx that are controlled on the time axis exhibits a characteristic in which an inclination is large and follows the change of the steering angle. Accordingly, as shown in FIG. 4D, the change of the irradiating directions of the headlamps to the change in steering angle exhibits a characteristic in which the following response is high. In the first exemplary embodiment, this characteristic in which the following response is high is set as the normal following response.

In the first exemplary embodiment, the angular acceleration is calculated, and the calculated angular acceleration is compared with the reference angular acceleration so as to control the intensity of the filtering effect of the filtering section 15, whereby when the steering angle is changed moderately by the steering wheel STW being turned moderately, the following response of the filtering section 15 is set high, thereby making it possible to implement a swivel control in which the irradiating directions of the headlamps are made to follow the steering angle with good following response. On the other hand, when the steering angle is changed drastically as when the steering wheel STW is started to be turned, the following response of the filtering section 15 is set low so as to implement a swivel control in which the irradiating directions of the headlamps do not follow immediately the change in steering angle. Namely, when the driver turns the steering wheel STW, the response speed of the irradiating directions of the lamps to the change in steering angle is lowered, and there occurs no situation in which the irradiating directions of the headlamps are changed drastically, and thereafter, when steering continues, the irradiating directions of the lamps come to follow the steering angle, whereby the foreground in the traveling direction of the subject vehicle comes to be illuminated.

Consequently, since the angular acceleration becomes equal to or larger than the reference angular acceleration when the steering wheel STW turns minutely or the steering angle changes minutely due to the sawing operation by the driver or irregularities on the road surface, the filtering effect of the filtering section 15 is set to the high state, whereby there occurs no situation in which the irradiating directions of the lamps are changed. Because of this, in first exemplary embodiment, the irradiating directions are not deflected frequently by the minute steering angle changes when the vehicle is traveling straight ahead without particularly providing the ignorable range in the minute steering angle range about the straight-ahead traveling direction, and therefore, there occurs no situation in which the driver is made to feel the sensation of physical disorder. By this configuration, therefore, the difficulties in setting the ignorable range can be avoided.

In addition, in the first exemplary embodiment, when the safety of a foreground area immediately before the subject vehicle is attempted to be verified while steering the vehicle slowly at an urban intersection where there are many pedestrians walking therethrough, since the filtering effect of the filtering section 15 is set high when the angular acceleration at the initial state of the steering is large, the irradiating directions of the lamps do not follow immediately the change in steering but the irradiating directions of the lamps are held in a state in which the irradiating directions are directed to the straight-ahead traveling direction, whereby the safety of the foreground area of the subject vehicle can be verified. Thereafter, when the steering continues, since the angular acceleration becomes small, the filtering effect of the filtering section 15 becomes low, whereby the irradiating directions of the lamps start to follow the steering angle. By this, a deflection control of the irradiating directions which corresponds to steering is implemented, whereby the driver is made not to feel the sensation of physical disorder while ensuring the safety in driving the vehicle.

Second Exemplary Embodiment

Figure 5:
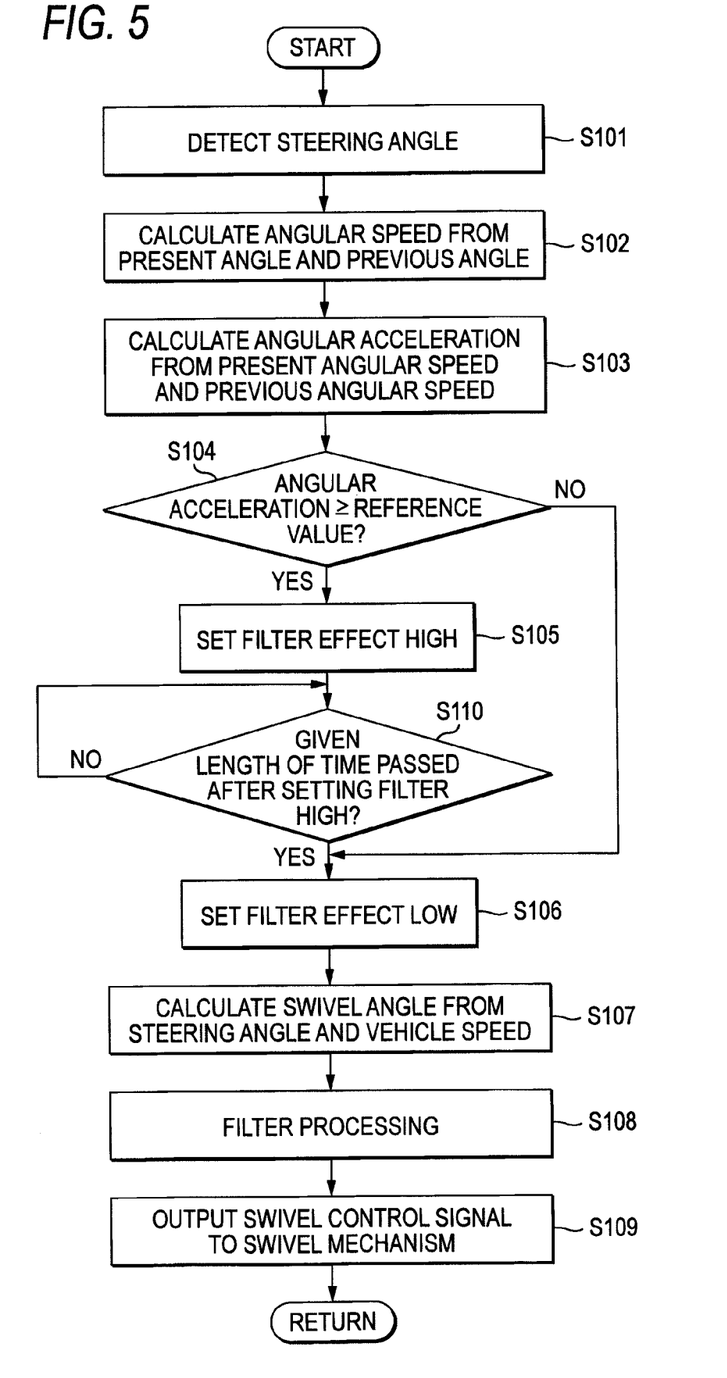
FIG. 5 is a flowchart of an operation of a lamp system according to a second exemplary embodiment.

FIG. 5 is a flowchart of a swivel control according to a second exemplary embodiment. In the flowchart of FIG. 5, operations that are identical to the operations in the flowchart of FIG. 3 are denoted with the same reference numerals. In a second exemplary embodiment, in operation S104, a filter control section 13 compares an angular acceleration with a reference angular acceleration and sets high a filtering effect of a filtering section 15 to execute a swivel control when the angular acceleration is equal to or larger than the reference angular acceleration, as in the first exemplary embodiment. However, in the second exemplary embodiment, after the filter control section 13 sets the filtering effect to high, the filter control section 13 counts a time during which the swivel control is implemented in operation S110 which is additionally provided so that the filtering effect of the filtering section 15 is held in the high state until a point in time at which a certain time period T1 has elapsed since a point in time at which the filtering effect was set high, and thereafter, the setting of the filtering effect is changed so that the filtering effect becomes low.

While in the first exemplary embodiment, the filtering effect of the filtering section 15 is kept high for the time period during which the angular acceleration continues to be equal or larger than the reference angular acceleration, it is almost only when steering is initiated that the angular acceleration becomes equal to or larger than the reference angular acceleration. Because of this, in many cases, the time period during which the filtering effect of the filtering section 15 is set high is an extremely short period of time, and the filtering effect comes to be set low immediately and the irradiating directions of the lamps are made to follow the steering angle. In the second exemplary embodiment, however, as is shown in FIG. 4E, since the filtering effect of the filtering section 15 is held in the high state for the time period T1 since the filtering effect was set high due to the angular acceleration becoming equal to or larger than the reference angular acceleration, the deflection control of the irradiating directions of the lamps is made to stay in the state in which the following capability is low for the time period T1, whereby the driver is prevented from being made to feel the sensation of physical disorder caused due to the irradiating directions of the lamps following the steering angle for the time period T1. That is, because the frequent change in the irradiating direction of the lamp is prevented, the driver does not have to feel the sensation of troublesomeness and driving safety is increased.

In addition, looking at the second exemplary embodiment from a different point of view, the filtering effect of the filtering section 15 becomes weak or low when the time period T1 has elapsed since the filtering effect of the filtering section 15 was set high. According to this point of view, the suppression of the deflection control of the irradiating directions of the lamps is released after the time period T1 has elapsed, whereby it becomes possible to avoid a condition in which a traveling area ahead of the subject vehicle is not illuminated sufficiently due to the deflecting operation of the irradiating directions of the lamps being suppressed too long with no proper reason.

Third Exemplary Embodiment

Figure 6:
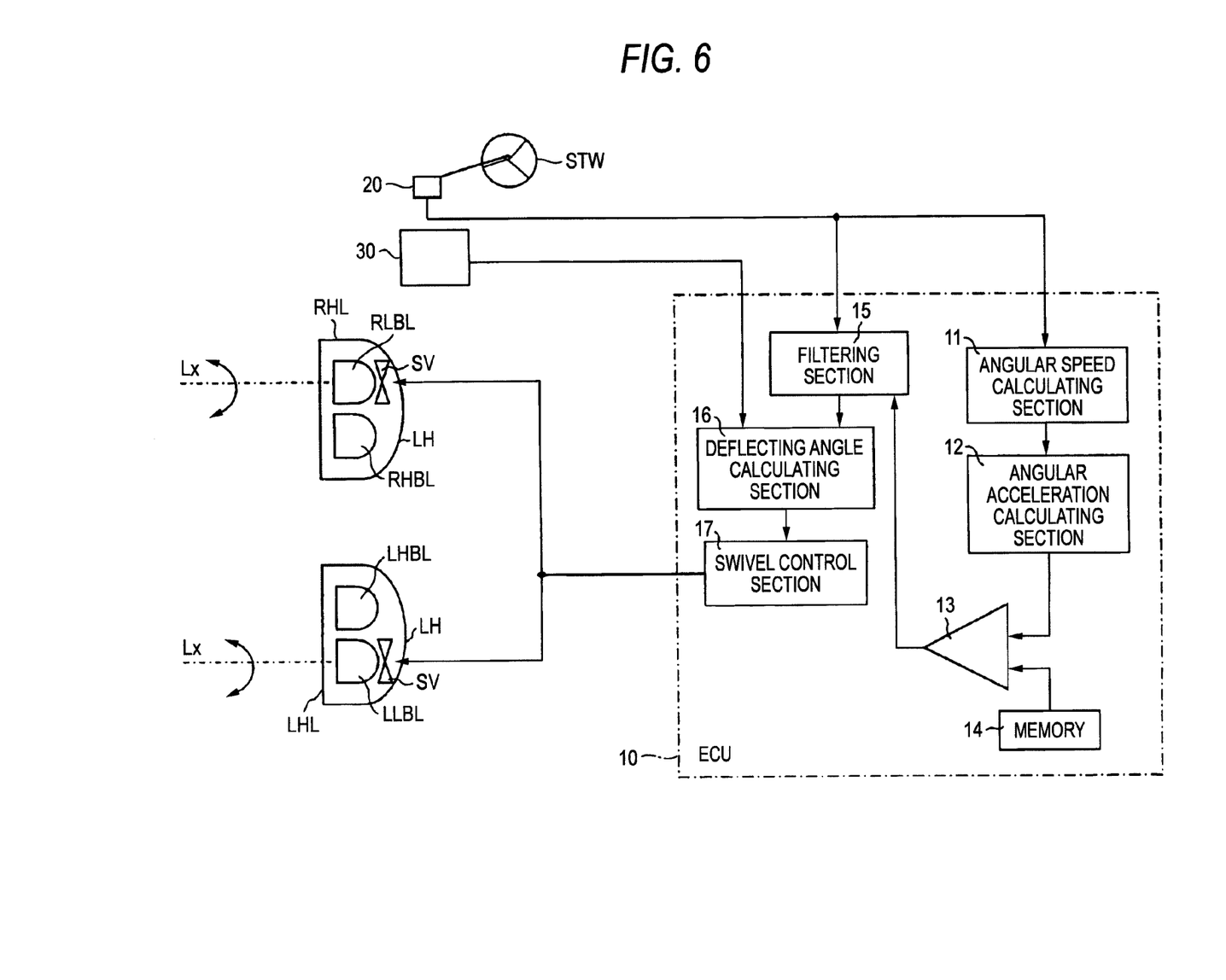
FIG. 6 is a block diagram of a lamp system according to a third exemplary embodiment.

In the first exemplary embodiment, the configuration is adopted in which the filtering section 15 is coupled to an output side of the swivel control section 17 so as to control the following response of the swivel control signal. However, the filtering section 15 may be coupled to any location along the length of a signal path extending between an output end of the steering angle sensor 20 to the swivel mechanisms SV. For example, in a third exemplary embodiment shown in FIG. 6, a configuration may be adopted in which a filtering section 15 is coupled between a steering angle sensor 20 and a deflection angle calculating section 16. In this case, the filtering section 15 controls the response of a steering angle signal based on a result of a comparison of an angular acceleration with a reference value. A deflection angle is calculated by the deflection angle calculating section 16 based on the steering angle signal whose response is controlled. A swivel control signal is generated by a swivel control section 17 based on the deflection angle so calculated, and a swivel control is implemented based on the swivel control signal so generated. Since the swivel control signal has already been controlled based on the value of the angular acceleration with respect to the following response to the steering angle, a swivel control similar to that of the first exemplary embodiment can be realized. In FIG. 6, the configurations that are the same as those in FIG. 1 are denoted with the same reference numerals, and the description thereof will be omitted.

Modifications to Exemplary Embodiments

In the respective exemplary embodiments that have been described heretofore, the filtering section 15 comprises the CR circuit, and the following response is made to be switched by changing the time constants by switching the capacitors. However, the filtering section 15 may alternatively comprise an active filter circuit.

In addition, in the above-described exemplary embodiments, the time constants of the single filtering section are switched or the time constant thereof is changed. However, an alternative configuration may be adopted in which a plurality of filtering sections are provided, for example a filtering section with a high following response and a filtering section with a low following response. Accordingly, these filtering sections are selected for coupling based on the magnitude of an angular acceleration.

In addition, a configuration may be adopted in which a filtering section is provided whose following response is reduced only when the angular acceleration is equal to or larger than the reference value.

While description has been made in connection with exemplary embodiments of the present invention, those skilled in the art will understand that various changes and modification may be made therein without departing from the present invention. It is aimed, therefore, to cover in the appended claims all such changes and modifications falling within the true spirit and scope of the present invention.

What is claimed is:

1. A lamp system comprising:
   a swivel control section which is configured to control an irradiating direction of a lamp so as to follow a steering angle of a steering wheel of a vehicle;
   a filter section which is configured to change a following response of a change of the irradiating direction with respect to a change of the steering angle; and
   a filter control section which is configured to control the filter section to decrease the following response when an angular acceleration of the steering angle is greater than or equal to a reference value.

2. The lamp system according to claim 1, wherein the filter control section is configured to control the filter section to increase the following response when the angular acceleration is less than the reference value.

3. The lamp system according to claim 1, wherein the filter control section is configured to control the filter section to maintain the following response until a time period elapses from a time at which the filter control section has controlled the filter section to decrease the following response.

4. The lamp system according to claim 1, further comprising:
   a steering angle sensor which is configured to detect the steering angle of the steering wheel; and
   an angular acceleration calculating section which is configured to calculate the angular acceleration of the steering angle based on the steering angle detected by the steering angle sensor,
   wherein the swivel control section controls the irradiating direction so as to follow the steering angle detected by the steering angle sensor, and
   the filter control section controls the filter section in accordance with the angular acceleration calculated by the angular acceleration calculating section.

5. The lamp system according to claim 4, further comprising a vehicle speed sensor which is configured to detect a vehicle speed, wherein the swivel control section controls the irradiating direction based on the vehicle speed.

6. A method of controlling a deflection of an irradiating direction of a lamp, the method comprising:
   detecting a steering angle of a steering wheel;
   calculating an angular acceleration of the detected steering angle;
   comparing the calculated angular acceleration with a reference value; and
   decreasing a following response of the deflection of the irradiating direction with respect to the steering angle if the calculated angular acceleration is greater than or equal to the reference value.

7. The method according to claim 6, further comprising increasing the following response if the calculated angular acceleration is less than the reference value.

8. The method according to claim 6, further comprising maintaining the following response until a time period elapses from a time at which the following response is decreased.

* * * * *